March 2, 1943.   P. MANN   2,312,922
AUTOMATIC MACHINE FOR DRILLING, REAMING, ETC
Filed Oct. 3, 1941   5 Sheets-Sheet 3

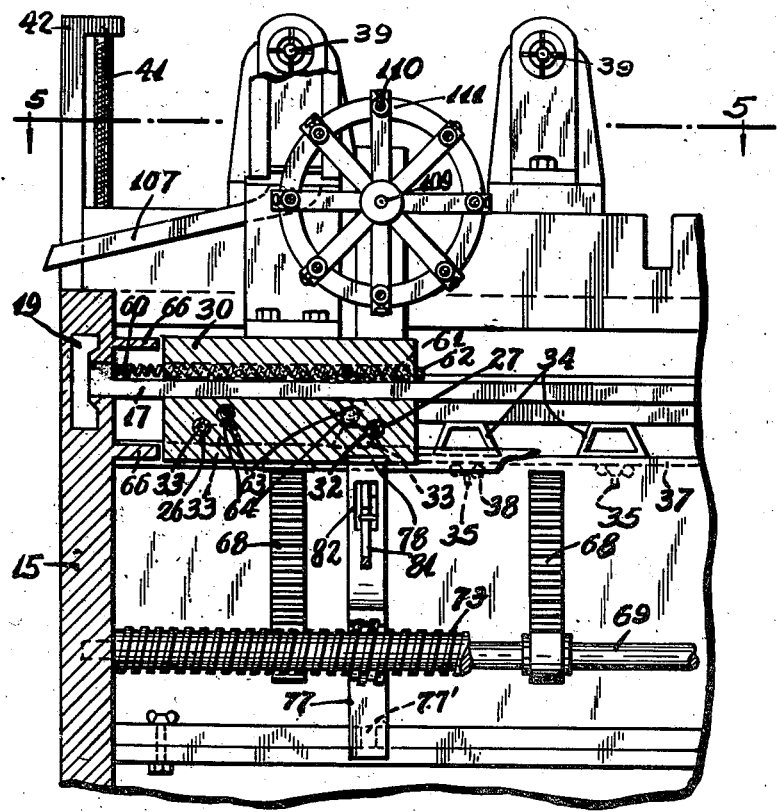
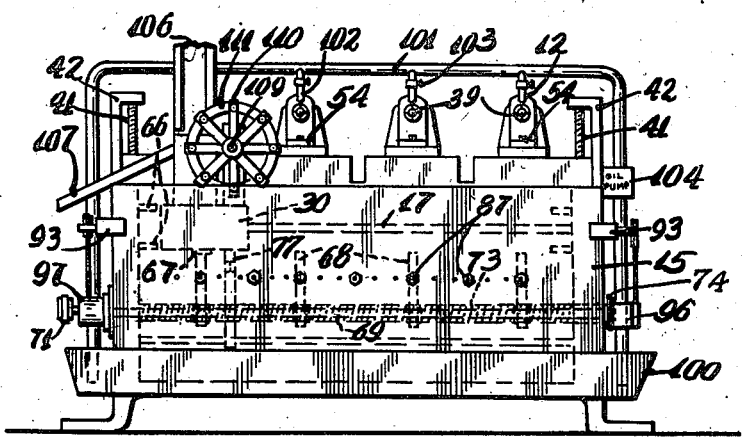

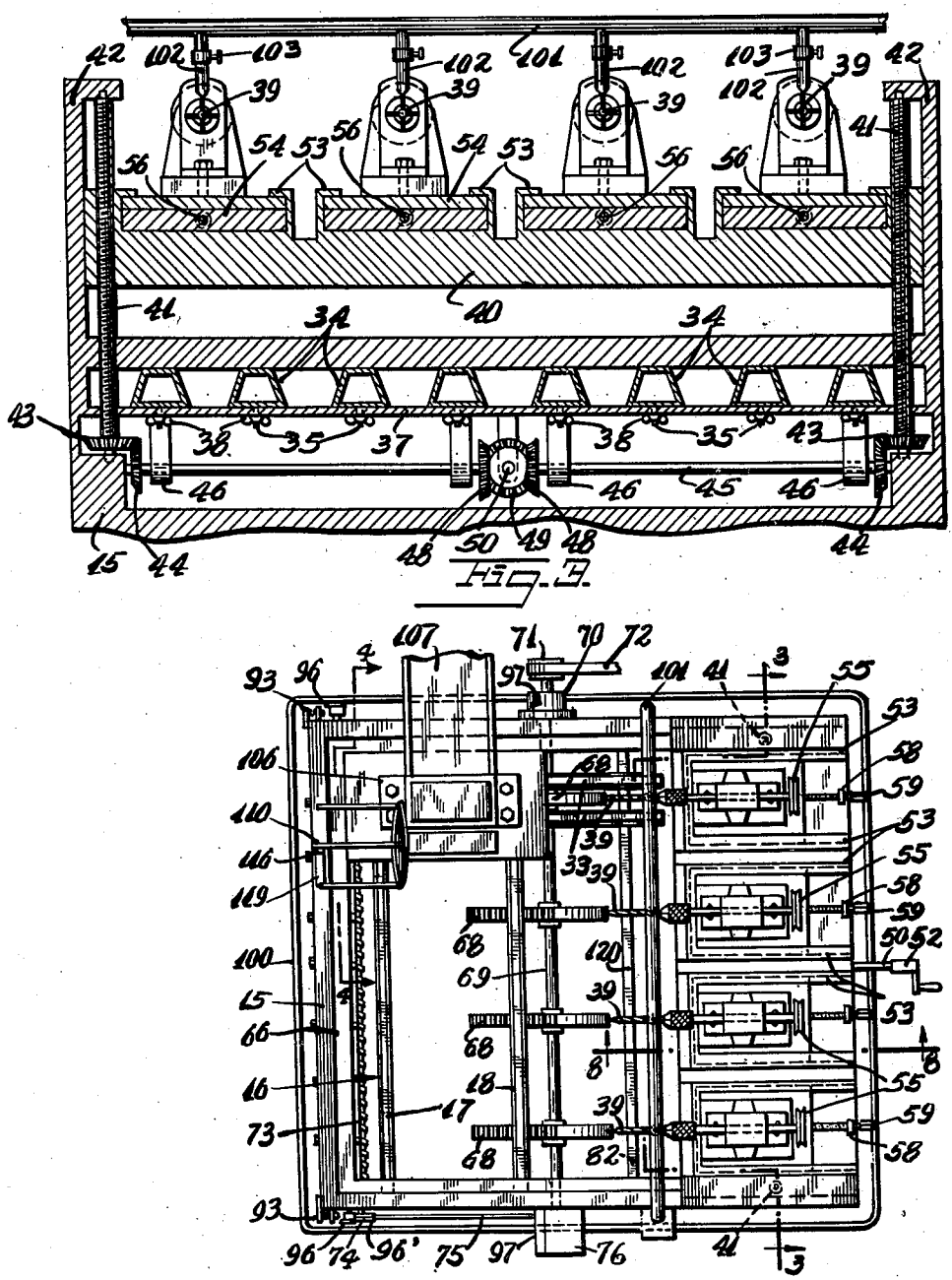

INVENTOR
Philip Mann
BY
ATTORNEY

March 2, 1943. P. MANN 2,312,922
AUTOMATIC MACHINE FOR DRILLING, REAMING, ETC
Filed Oct. 3, 1941 5 Sheets-Sheet 4
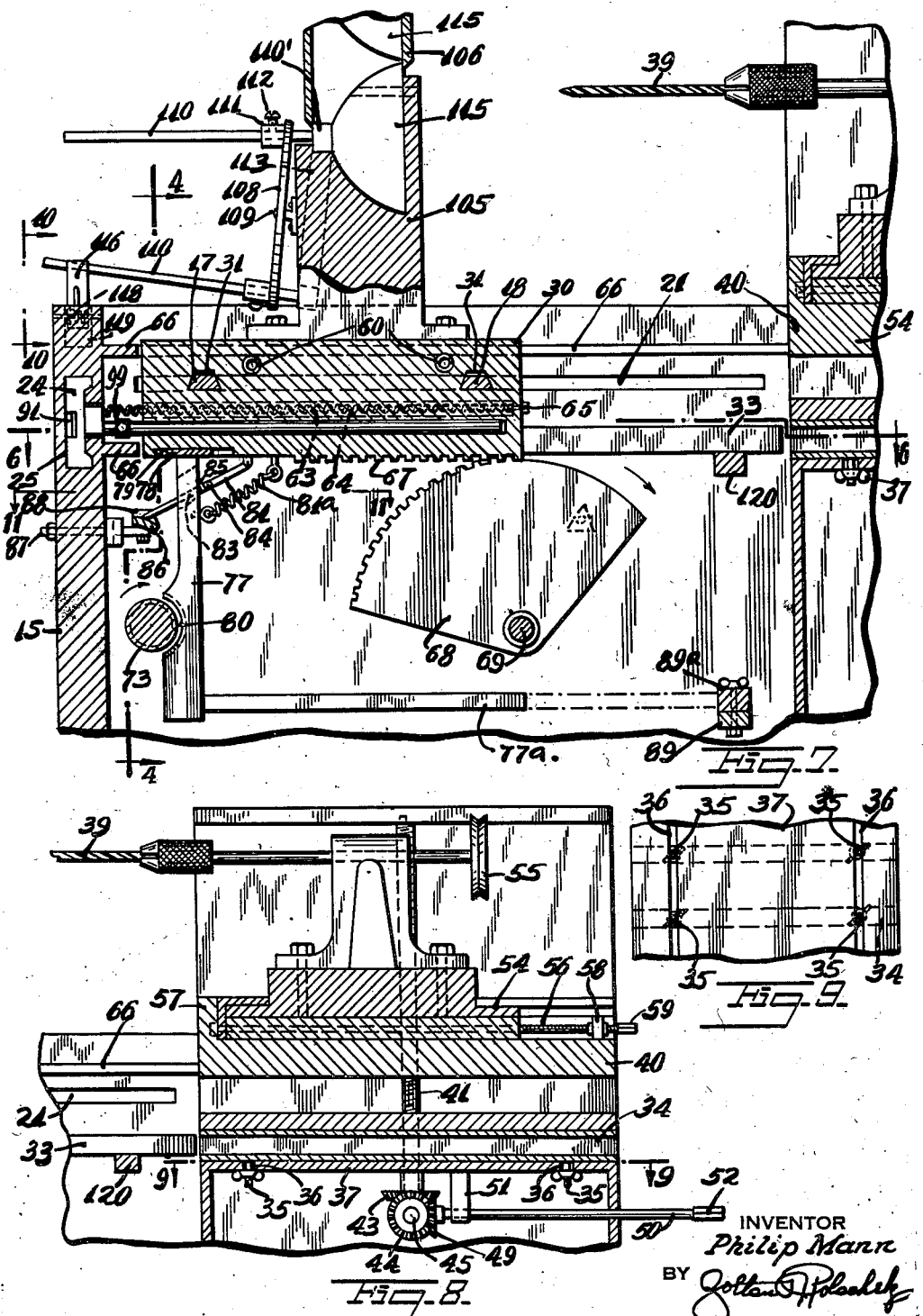
INVENTOR
Philip Mann
BY
ATTORNEY March 2, 1943. P. MANN 2,312,922
AUTOMATIC MACHINE FOR DRILLING, REAMING, ETC
Filed Oct. 3, 1941 5 Sheets-Sheet 5
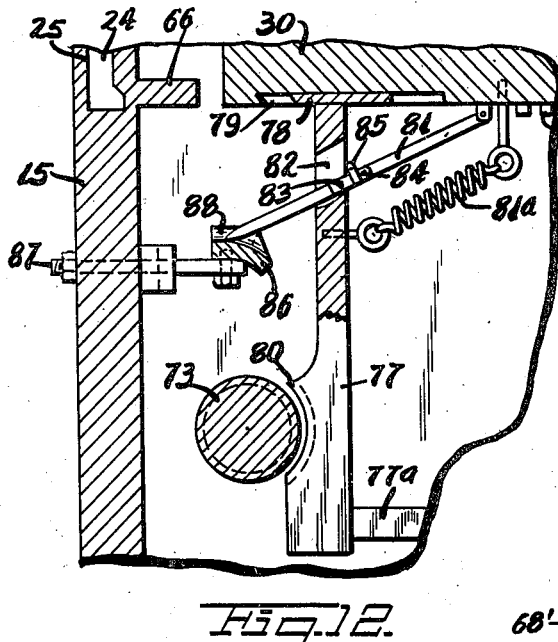
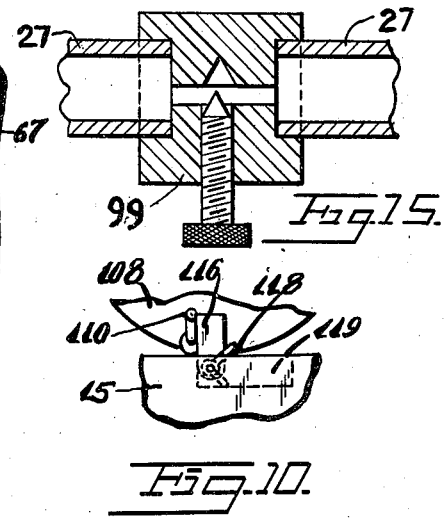
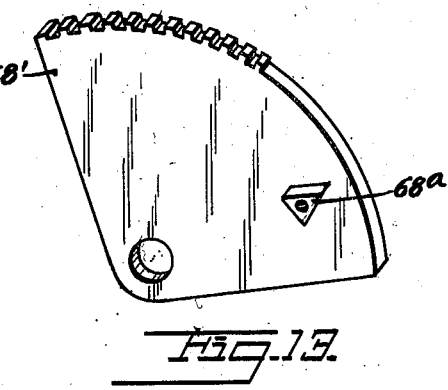
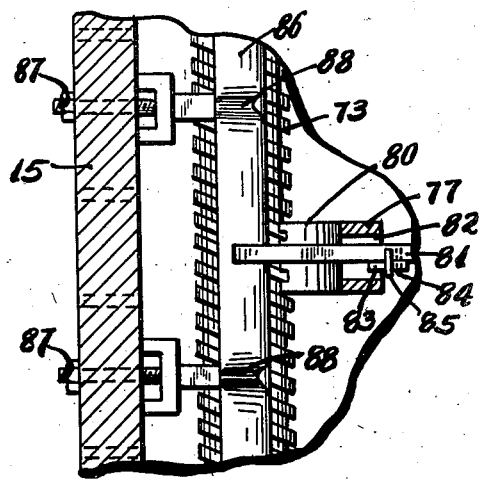
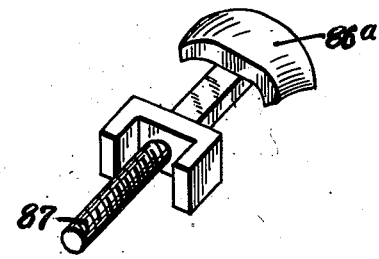
INVENTOR
Philip Mann
BY
ATTORNEY Patented Mar. 2, 1943

2,312,922

UNITED STATES PATENT OFFICE 2,312,922

AUTOMATIC MACHINE FOR DRILLING, REAMING, ETC.

Philip Mann, Dover, N. J.

Application October 3, 1941, Serial No. 413,395

11 Claims. (Cl. 77—22)

This invention relates to new and useful improvements in an automatic machine for drilling, reaming, burring, tapping, and performing other similar operations on all sizes and shapes of small pieces of work with particular adaptability for those which must now be done by hand operations.

The invention contemplates the construction of a machine as mentioned which is characterized by a frame having a transverse rail system slidably mounted thereon, and also having a longitudinal rail system slidably mounted thereon, and a work supporting platform mounted on said rail systems so as to be capable of moving transversely and longitudinally, as desired.

The invention further contemplates the provision of adjustable support means for a gang of tools, said means being mounted on said frame, and said tools are cooperative with a piece of work mounted on said supporting platform.

Still further the invention contemplates the provision of a supply chute, a discharge chute, and holding means mounted on said work supporting platform for supplying, holding and discharging the work as required.

Still further resilient means is proposed for urging the work supporting platform transversely to a starting point; additional resilient means is proposed for urging said work supporting platform longitudinally to a starting point, and a novel mechanism is also provided for successively moving said platform into and from certain position in which the gang of tools may individually or collectively perform on the work.

Still further an oil tray and an oil circulating system is proposed to supply the gang of tools with the necessary lubrication during the operation of the machine.

For further comprehension of this invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of an automatic machine constructed in accordance with this invention.

Fig. 2 is a plan view of the machine shown in Fig. 1.

Fig. 3 is a transverse enlarged vertical sectional view taken on the line 3—3 of Fig. 2.

Fig. 4 is a fragmentary enlarged vertical sectional view taken on the line 4—4 of Fig. 2.

Fig. 7 is a fragmentary vertical sectional view taken on the line 7—7 of Fig. 5.

Fig. 8 is a fragmentary enlarged vertical sectional view taken on the line 8—8 of Fig. 2.

Fig. 9 is a fragmentary horizontal sectional view taken on the line 9—9 of Fig. 8.

Fig. 10 is a fragmentary elevational view looking in the direction of the line 10—10 of Fig. 7.

Fig. 11 is a fragmentary horizontal sectional view taken on the line 11—11 of Fig. 7.

Fig. 12 is a fragmentary enlarged detailed view of Fig. 7.

Fig. 13 is a perspective detail view of a part used in the device.

Fig. 14 is a perspective view of another member for releasing the follower in this device.

Fig. 15 is a horizontal sectional view of one of the needle valves, per se.

Figure 6:
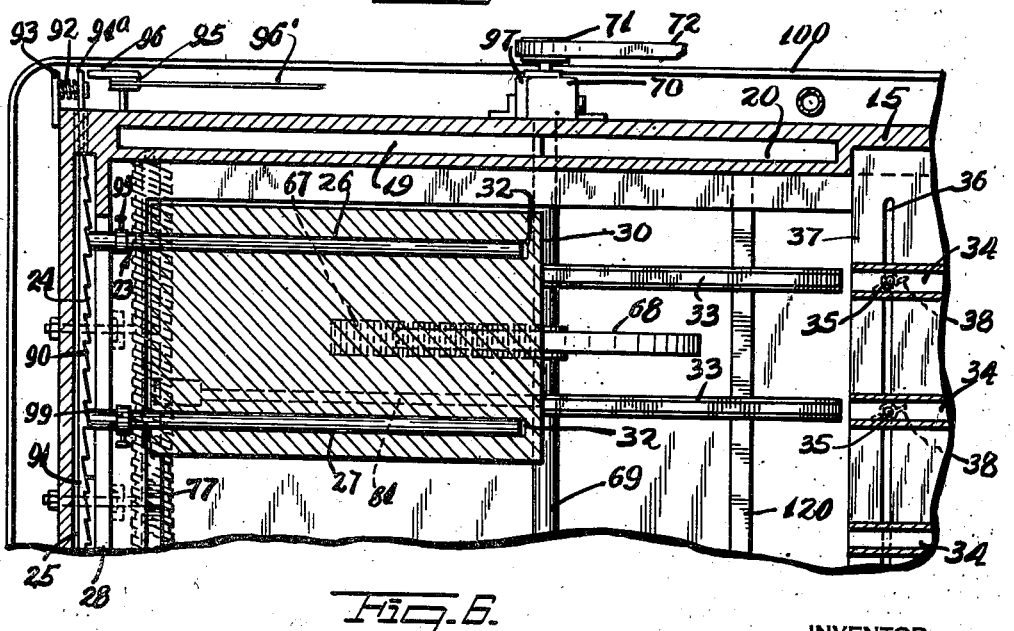
Fig. 6 is a fragmentary horizontal sectional view taken on the line 6—6 of Fig. 7.

The automatic machine, in accordance with this invention, includes a rectangular frame 15. A transverse rail system 16, see Figs. 2 and 6, is slidably mounted to move longitudinally on said frame 15. This rail system comprises a pair of spaced rails 17 and 18 disposed transversely of the frame 15 and provided with slides 19 at its ends. These slides 19 are slidably mounted in recesses 20 formed in the opposed side walls of the frame 15. The rails 17 and 18 project out from slots 21 formed in the inner faces of the said side walls of the frame 15. Each of the rails 17 and 18 has inclined sides, see particularly Fig. 7. The transverse rail system 16 is capable of moving along the longitudinal direction of the frame 15.

The frame 15 is also provided with a longitudinal rail system 23, see particularly Fig. 6. This longitudinal rail system includes a slide 24 slidably mounted in a groove 25 formed in one of the transverse sides of the frame 15. A pair of rails in the form of tubes 26 and 27 project from the slide 24. These tubes extend out from a slot 28 formed in the latter mentioned side wall of the frame 15. The arrangement is such that the longitudinally extending rail system 23 may move transversely in the frame 15.

A work support platform 30 is mounted on the said rail systems 16 and 23 so as to be capable of moving transversely and longitudinally. More specifically, the rails 17 and 18 of the rail system 16 pass through complementary openings 31 formed in the platform 30. The rails 26 and 27 engage into complementary receiving openings 32 extended inwards from one of the sides of the platform 30 and terminating a short distance from the other side of the platform.

A pair of rails 33 project from the latter mentioned side of the platform 30 and are engageable with tubular support sockets 34 mounted on the frame 15. More particularly, there are a plurality of the sockets 34 each of which is provided with a pair of screws 35 extending through slots 36 formed in a transverse support plate 37 mounted on the frame 15.

Each screw 35 is provided with a wing nut 38 by which it may be tightly clamped in position. The arrangement is such that the wing nuts 38 may be loosened and then the tubular sockets 34 may be shifted transversely in the frame 15 so as to properly line up with the rails 33 during the operation of the work supporting platform 30, as will become clear as this specification proceeds. It should be clear, at this time, that the work support platform 30 is capable of moving to various transverse positions on the rail system 16, and is capable of moving to various longitudinal positions on the rail system 23.

Adjustable support means is provided for a gang of tools 39 which may be drilling, boring, and the like tools. This adjustable means is mounted on the frame 15 so that the tools may be cooperative with a piece of work mounted on the supporting platform 30. More specifically, the adjustable support means for the gang of tools 39 includes a platform 40 which is supported by a pair of vertical screws 41 rotatively mounted in brackets 42 which are mounted on the frame 15. The screws 41 threadedly engage the platform 40. The screws 41 are provided with beveled gears 43 which mesh with beveled gears 44 on rotatively supported shafts 45. The shafts 45 are mounted in bearings 46 which are mounted on the bottom of the plate 37.

The shafts 45 are also provided with beveled gears 48 which mesh with a beveled gear 49 on a drive shaft 50. This drive shaft 50 is rotatively supported in a bearing 51 mounted on the bottom of the plate 37. The drive shaft 50 is provided with a square outer end 52 adapted to be engaged by a turning tool for indirectly causing turning of the screws 41 which will raise or lower the platform 40, depending upon the direction in which the screws are turned.

The platform 40 supports a plurality of runners 53 extending longitudinally of the frame 15 and guiding blocks 54 upon which the tools 39 are rotatively mounted. Each tool 39 is provided with a pulley 55 by which they may be driven. The drive means will not be disclosed in this specification as it forms no part of the invention. Each block 54 may be longitudinally adjusted. Each block 54 is provided with a screw 56 threadedly engaging the block and rotatively mounted on the platform 40. One end of each screw 56 is supported in a projecting lug 57 from the platform 40, while the other end is supported by a bearing 58 mounted on the platform 40. Each screw 56 has a square head 59 adapted to receive a turning tool by which the screw may be turned to indirectly move the tool 39 forwards and rearwards, as desired.

Resilient means is provided for urging the supporting platform 30 transversely to a starting position. This resilient means consists of a pair of springs 60 attached to the slide 19 and extending into bores 61 formed in the platform 30. The other ends of these springs 60 are attached by holding members 62 to the remote sides of the said platform 30. Additional resilient means is provided for urging the said work supporting platform 30 longitudinally to a starting position. This resilient means comprises a pair of springs 63 attached at one of their ends upon the slide 24 and extending into bores 64 formed in the platform 30.

Figure 5:
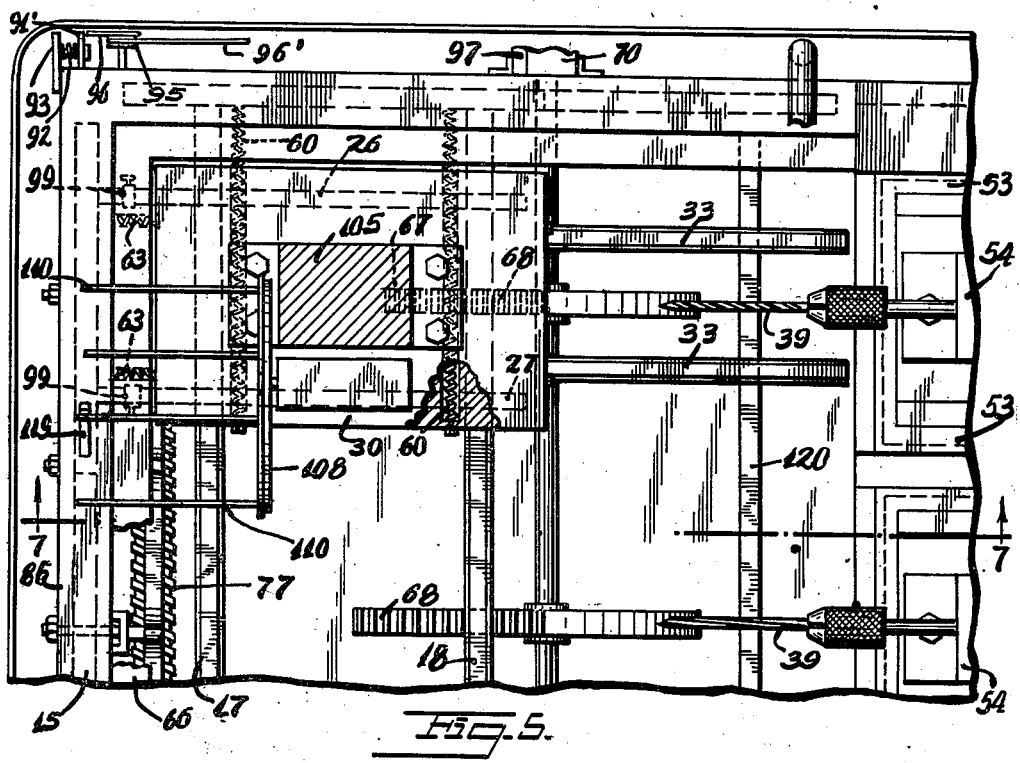
Fig. 5 is a fragmentary horizontal sectional view taken on the line 5—5 of Fig. 4.

The springs 63 have their inner ends secured to fastening means 65 mounted on the remote side of the platform 30. More specifically, the action of the resilient means is such that the platform 30 is normally urged into the corner of the frame 15 in which it is illustrated in Figs. 2, 5 and 6. The frame 15 is provided with several inwardly projecting flanges 66 formed upon the inner sides thereof and forming abutments against which the platform 30 engages. The springs 63 are stronger than the springs 60 because they must pull the platform and work free from the tools.

The platform 30 is provided with a rack 67 which extends longitudinally thereof. A gang of driven segmental gears 68 are cooperative with this rack 67 to move the platform 30 longitudinally when the platform is located at certain transverse positions. Each of the segmental gears 68 is mounted on a shaft 69 which extends transversely of the frame 15. This shaft 69 connects with a speed control transmission 70 which is provided with a pulley 71 engaged by a driver belt or chain 72 operated by some prime mover not illustrated on the drawings.

Means is provided for moving and holding the platform 30 in succession in the said certain transverse positions. Said moving and holding means includes a screw 73 rotatively supported transversely of and on the frame 15. This screw 73 is continuously turned by a sprocket wheel 74 which is mounted on one end of the screw and is engaged by a chain 75 connected with a speed transmission means 76 driven by the shaft 69. A follower 77 is adjustably mounted on the bottom of the platform 30. This follower is mounted on a slide 78 which is slidably mounted in a complementary receiving groove 79 formed in the bottom portion of the platform 30.

The follower 77 has a curved threaded side 80 which is adapted to engage the threads of the screw 73 to transmit a transverse movement to the platform 30. A tension spring 81a acting between the follower 77 and the platform 30 normally holds the follower 77 in an inoperative position. A latch device is provided for holding the follower 77 an operative position with the threaded side 80 engaging the screw 73. This latch device includes a rod 81 pivotally mounted at one end on the bottom of the platform 30 and extending through a large opening 82 formed in the follower 77. A bolt 83 is pivotally mounted by a pintle 84 upon the rod 81. The bolt 83 has a projecting finger 85 which will engage against the top of the rod 81 when the bolt 83 moves slightly downwards into its operative position. As illustrated in Fig. 12 it is now inoperative.

The free end of the rod 81 rests upon a rail 86 which is supported by bolts 87 on the frame 15. This rail 86 extends the entire transverse width of the frame 15 and at certain points has projecting cams 88 adapted to lift the rod 81 to free the bolt 83 from engaging against the back of the follower 77. A projection 77a from the follower 77 is adapted to strike a stationary bar 89 mounted transversely across the frame 15, to move the follower 77 into its operative position. This may be best understood by examining Figs. 7, 11 and 12. When the segmental gear 68 drives the platform 30 towards the right the projection 77a will strike the bar 89 at the instant that the platform 30 reaches the end of its motion to the right. This engagement will move the follower 77 towards the left against the action of the spring 81a. The bolt 83 moves downwards under the influence of gravity and gets behind the follower 77 to hold it in its new position, which represents its operative position, against the action of the spring 81a.

When the platform 30 next reaches its extreme left position the follower 77 will engage the screw 73 which will move the platform 30 transversely, that is, downwards in relation to Fig. 2. The platform 30 will continue in this direction until the free end of the rod 81 rides over one of the cam projections 88. This lifts the rod 81 so as to lift the depending bolt 83 above the bottom of the opening 82. The follower 77 is now free and will be moved to its inoperative position by the spring 81a, that is, to the position illustrated in Fig. 12. The platform 30 now stops moving transversely. It is now in a position in which another one of the segmental gears 68 can and does engage the rack 67 of the platform 30, and starts moving the platform 30 towards the right. The platform 30 will retain the various transverse positions into which it is moved by the follower 77 engaging the screw 13 by a certain retaining means.

The retaining means referred to above includes ratchet teeth 90 formed upon one side of the slide 24, see particularly Fig. 6, and engaging a complementary ratchet tooth bar 91. This bar 91 has its ends 91a projecting from the frame 15. Springs 92 act between brackets 93 mounted on the frame 15 and the ends 91a to urge the bar 91 into operative position. The construction is such that while the platform 30 moves from its starting point to various positions as controlled by the screw 73 and the follower 77, the rack bar 91 will move against the action of the springs 92 to permit the platform 30 to move as stated. However, the springs 60 cannot return the platform 30 because of the holding action of the rack bar 91.

Means is provided for releasing the rack bar 91 at a certain time so that the springs 60 may return the platform 30 to its starting point. This means includes pulleys 95 rotatively mounted on the sides of the frame 15 and carrying cams 96. These cams are adapted to strike the ends 91a and cam the rack bar 91 laterally to free it from the rack teeth 90 so that the platform 30 is free to move back to its starting position. The pulleys 95 are turned by endless chains or belts 96' which are operated by a transmission means 97 operated by the shaft 69.

A dashpot mechanism is provided to prevent the platform 30 from traveling too rapidly towards the left when the segmental gears 68 disengage from the rack 67. This dashpot means is in the nature of a dashpot piston and cylinder action. The tubes 26 and 27 comprise the pistons working in the bore 32 which act as the cylinders. The tubes 26 and 27 are provided with needle valves 99 which may be regulated to control the passage of air. The needle valves 99 are adjusted to control the rate at which the air entrapped within the tubes and bores will be expelled when the platform 30 moves towards the left under the influence of the springs 63 causing the tubes to reenter the bores.

In this way the cushioning effect is produced. The frictional resistance of the tracks 17 and 18 working in the openings 31 is depended upon to control the return of the platform 30 to its transverse starting position under the action of the springs 60.

An oil pan 100 is mounted beneath the frame 15 and projects past the sides of the frame. An oil supply pipe 101 extends over the gang of tools 39 and has individual discharge branches 102 which are individually controlled by cocks 103. An oil pump 104 is arranged in the oil line 101 and is for the purpose of pumping oil or other liquid from the oil pan 100 to the various branches 102 to discharge against the gang of tools 39. One or more of the branches 102 may be shut off by the cocks 103, when desired. The oil discharged by these branches will be caught by the pan 100 and recirculated by the pump 104.

The platform 30 is provided with a work holding bracket 105. A supply chute 106 for the work connects with the bracket 105. A discharge chute 107 is also connected with the bracket 105. A work discharge means is associated with the bracket 105 and comprises a member 108 which is turnably mounted by a pintle 109 on the side of the bracket 105. This member 108 supports a plurality of holding fingers 110. Each of these fingers 110 engages through a socket 111 which is provided with a set screw 112, by which the fingers may be properly adjusted. The heads 110' of the fingers 110 pass through a groove 113 formed in the bracket 105. Normally, one of the fingers 110 holds a piece of work, indicated in Fig. 7 by the numeral 115.

Means is provided for operating the discharge means which includes a vertical finger 116 mounted on a pintle 117 and held in vertical position by a spring 118. The finger 116 normally engages against one end of a slot 119 formed in the top of the frame 15. The arrangement is such that when the platform 30 passes downwards, in relation to the illustration in Fig. 5, one of the fingers 110 will strike the finger 116 pivoting it downwards so that the work discharge means merely idles past. These fingers may be changed depending on shape and size of piece to be worked on.

Thus, the piece of work 115 is being held during the operation of the gang of tools 39 on it. However, when the platform 30 returns to its starting position one of the fingers 110 will strike the finger 116 in the opposite direction. In this direction the finger 116 cannot lay down into the slot 119, and consequently the disc 108 will be turned. During the turning of the head 110, one of the fingers 110 which is holding the work 115 will move the work towards the discharge 107, and a short time later an adjacent head 110' will catch and hold the next piece of work 115 which moves down in the supply chute 106.

A bar 120 is mounted across the frame 15 beneath the rails 33 to assist in supporting these rails.

The operation of the device is as follows:

The platform 30 starts from the position illustrated in Fig. 2. The first segmental gear 68 is meshing with the rack 67 of the platform 30. The shaft 69 starts rotating so that the segmental gear 68 moves the platform 30 longitudinally to engage the work supported on the platform 30 against the first tool 39.

When the platform 30 reaches the end of its motion towards the first tool 39, the projection 77a of the follower 77 will engage a removable projection 89a of the bar 89 forcing the follower 77 towards the left, as illustrated in Fig. 7, which is the operative position. The bolt 83 immediately acts to hold the follower 77 in this position. Then the segmental gear 68 releases the platform 30 which is then returned to its left hand position by the springs 63. When it reaches its left hand position the follower 77 engages the screw 73 which moves the platform 30 transversely until the rod 81 rides upon the first cam projection 88 of the rail 86. This lifts the bolt 83 above the bottom of the openings 82 in the follower 77, releasing the follower which is moved out of contact with the screw 73 by the spring 81a.

At this instant the second one of the segmental gears 68 comes into mesh with the rack 67 of the platform 30 to move the platform 30 again towards the right to engage the work supported on the platform 30 against the second tool 39. The operation keeps repeating until the cams 96 engage the ends 91a of the ratchet rod 91. The ratchet rod 91 is then moved and releases the slide 24, whereupon the springs 60 return the platform 30 transversely to its starting position.

In Fig. 13, the segmental gear 68' is shown with a cam 68a which is adapted to engage the free end of the rod 81 for moving the follower 77 to engaging position with the screw 73.

The cam 68a may be secured to or removed from the segmental gear 68' to permit the platform 30 to be moved by the screw 73 when desired.

In Fig. 14 an individual release projection 88a is shown at the end of the bolt 87 which may be spaced at various positions for releasing the lock device of the follower 77 from screw 73.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An automatic machine for drilling and reaming, comprising a rectangular frame, a transverse rail system slidably mounted on said frame, a longitudinal rail system slidably mounted on said frame, a work supporting platform mounted on said rail systems to be movable transversely and longitudinally, adjustable support means for a gang of tools and mounted on said frame to be cooperative with a piece of work mounted on said supporting platform, resilient means urging said work supporting platform transversely to a starting position, resilient means urging said work supporting platform longitudinally to a starting position, a rack on said platform, a gang of driven segmental gears cooperative with said rack to move said platform longitudinally to certain transverse positions, means for moving and holding said platform in succession at said certain transverse positions, and means for releasing said platform.

2. An automatic machine for drilling and reaming, comprising a rectangular frame, a transverse rail system slidably mounted on said frame, a longitudinal rail system slidably mounted on said frame, a work supporting platform mounted on said rail systems to be movable transversely and longitudinally, adjustable support means for a gang of tools and mounted on said frame to be cooperative with a piece of work mounted on said supporting platform, resilient means urging said work supporting platform transversely to a starting position, resilient means urging said work supporting platform longitudinally to a starting position, a rack on said platform, a gang of driven segmental gears cooperative with said rack to move said platform longitudinally to certain transverse positions, means for moving and holding said platform in succession at said certain transverse positions, and means for releasing said platform, said transverse rail system comprises a slide slidably mounted on the frame and having projecting rails.

3. An automatic machine for drilling and reaming, comprising a rectangular frame, a transverse rail system slidably mounted on said frame, a longitudinal rail system slidably mounted on said frame, a work supporting platform mounted on said rail systems to be movable transversely and longitudinally, adjustable support means for a gang of tools and mounted on said frame to be cooperative with a piece of work mounted on said supporting platform, resilient means urging said work supporting platform transversely to a starting position, resilient means urging said work supporting platform longitudinally to a starting position, a rack on said platform, a gang of driven segmental gears cooperative with said rack to move said platform longitudinally to certain transverse positions, means for moving and holding said platform in succession at said certain transverse positions, and means for releasing said platform, said longitudinal rail system comprises a slide slidably mounted on the frame and having projecting rails.

4. A automatic machine for drilling and reaming comprising a rectangular frame, a transverse rail system slidably mounted on said frame, a longitudinal rail system slidably mounted on said frame, a work supporting platform mounted on said rail systems to be movable transversely and longitudinally, adjustable support means for a gang of tools and mounted on said frame to be cooperative with a piece of work mounted on said supporting platform, resilient means urging said work supporting platform transversely to a starting position, resilient means urging said work supporting platform longitudinally to a starting position, a rack on said platform, a gang of driven segmental gears cooperative with said rack to move said platform longitudinally to certain transverse positions, means for moving and holding said platform in succession at said certain transverse positions, and means for releasing said platform, said longitudinal rail system comprises a slide slidably mounted on the frame and having projecting rails, and supplementary supporting rails projecting from said platform and engageable in tubular sockets adjustably mounted in relation with said frame.

5. An automatic machine for drilling and reaming, comprising a rectangular frame, a transverse rail system slidably mounted on said frame, a longitudinal rail system slidably mounted on said frame, a work supporting platform mounted on said rail systems to be movable transversely and longitudinally, adjustable support means for a gang of tools and mounted on said frame to be cooperative with a piece of work mounted on said supporting platform, resilient means urging said work supporting platform transversely to a starting position, resilient means urging said work supporting platform longitudinally to a starting position, a rack on said platform, a gang of driven segmental gears cooperative with said rack to move said platform longitudinally to certain transverse positions, means for moving and holding said platform in succession at said certain transverse positions, and means for releasing said platform, said work supporting platform being provided with a supply chute, a discharge chute, and means for discharging the work.

6. An automatic machine for drilling and reaming, comprising a rectangular frame, a transverse rail system slidably mounted on said frame, a longitudinal rail system slidably mounted on said frame, a work supporting platform mounted on said rail systems to be movable transversely and longitudinally, adjustable support means for a gang of tools and mounted on said frame to be cooperative with a piece of work mounted on said supporting platform, resilient means urging said work supporting platform transversely to a starting position, resilient means urging said work supporting platform longitudinally to a starting position, a rack on said platform, a gang of driven segmental gears cooperative with said rack to move said platform longitudinally to certain transverse positions, means for moving and holding said platform in succession at said certain transverse positions, and means for releasing said platform, said adjustable support means comprises a platform, means for vertically adjusting said platform, runners on said platform, blocks for supporting said tools adjustably mounted on said runners, and means for moving said blocks into selected positions.

7. An automatic machine for drilling and reaming, comprising a rectangular frame, a transverse rail system slidably mounted on said frame, a longitudinal rail system slidably mounted on said frame, a work supporting platform mounted on said rail systems to be movable transversely and longitudinally, adjustable support means for a gang of tools and mounted on said frame to be cooperative with a piece of work mounted on said supporting platform, resilient means urging said work supporting platform transversely to a starting position, resilient means urging said work supporting platform longitudinally to a starting position, a rack on said platform, a gang of driven segmental gears cooperative with said rack to move said platform longitudinally to certain transverse positions, means for moving and holding said platform in succession at said certain transverse positions, and means for releasing said platform, said resilient means comprising springs attached to said rail systems and extending into bores formed in said platform and having their remote ends connected with the platform.

8. An automatic machine for drilling and reaming, comprising a rectangular frame, a transverse rail system slidably mounted on said frame, a longitudinal rail system slidably mounted on said frame, a work supporting platform mounted on said rail systems to be movable transversely and longitudinally, adjustable support means for a gang of tools and mounted on said frame to be cooperative with a piece of work mounted on said supporting platform, resilient means urging said work supporting platform transversely to a starting position, resilient means urging said work supporting platform longitudinally to a starting position, a rack on said platform, a gang of driven segmental gears cooperative with said rack to move said platform longitudinally to certain transverse positions, means for moving and holding said platform in succession at said certain transverse positions, and means for releasing said platform, said means for moving and holding said platform includes a rotative screw, a follower engageable with said screw, means for engaging said follower with the screw, means for disengaging the follower from the screw, a ratchet system for holding the platform so that it may move freely in one direction only, and means for discharging said ratchet system.

9. An automatic machine for drilling and reaming comprising a rectangular frame, a transverse rail system slidably mounted on said frame, a longitudinal rail system slidably mounted on said frame, a work supporting platform mounted on said rail systems to be movable transversely and longitudinally, adjustable support means for a gang of tools and mounted on said frame to be cooperative with a piece of work mounted on said supporting platform, resilient means urging said work supporting platform transversely to a starting position, resilient means urging said work supporting platform longitudinally to a starting position, a rack on said platform, a gang of driven segmental gears cooperative with said rack to move said platform longitudinally to certain transverse positions, means for moving and holding said platform in succession at said certain transverse positions, means for releasing said platform, and an oil tray beneath a gang of tools supported by said adjustable support means, and a circulating system for the oil to the various tools.

10. An automatic machine for drilling and reaming, comprising a rectangular frame, a transverse rail system slidably mounted on said frame, a longitudinal rail system slidably mounted on said frame, a work supporting platform mounted on said rail systems to be movable transversely and longitudinally, adjustable support means for a gang of tools and mounted on said frame to be cooperative with a piece of work mounted on said supporting platform, resilient means urging said work supporting platform transversely to a starting position, resilient means urging said work supporting platform longitudinally to a starting position, a rack on said platform, a gang of driven segmental gears cooperative with said rack to move said platform longitudinally to certain transverse positions, means for moving and holding said platform in succession at said certain transverse positions, and means for releasing said platform, said means for moving and holding said platform includes a rotative screw, a follower engageable with said screw, means for engaging said follower with the screw, means for disengaging the follower from the screw, a ratchet system for holding the platform so that it may move freely in one direction only, and means for discharging said ratchet system, said means for engaging said follower with said screw includes a projection from said follower engageable with a stationary bar at the moment that the platform reaches its extreme longitudinal position.

11. An automatic machine for drilling and reaming, comprising a rectangular frame, a transverse rail system slidably mounted on said frame, a longitudinal rail system slidably mounted on said frame, a work supporting platform mounted on said rail systems to be movable transversely and longitudinally, adjustable support means for a gang of tools and mounted on said frame to be cooperative with a piece of work mounted on said supporting platform, resilient means urging said work supporting platform transversely to a starting position, resilient means urging said work supporting platform longitudinally to a starting position, a rack on said platform, a gang of driven segmental gears cooperative with said rack to move said platform longitudinally to certain transverse positions, means for moving and holding said platform in succession at said certain transverse positions, means for releasing said platform, and an oil tray beneath a gang of tools supported by said adjustable support means, and a circulating system for the oil to the various tools, said means for disengaging the follower from the screw comprises resilient means urging the follower to a disengaged position, a latch for holding the follower in its engaged position, and a cam for moving said latch to an inoperative position.

PHILIP MANN.